March 2, 1971  KOICHI YOSHIMURA ET AL  3,566,600
ELECTRIC TIME-PIECE
Filed June 21, 1968  11 Sheets-Sheet 3

VOLTAGE AT POINT K

VOLTAGE AT POINT H

VOLTAGE AT POINT I

VOLTAGE AT POINT J

INPUT SIGNAL

VOLTAGE AT POINT V

VOLTAGE AT POINT W

VOLTAGE AT POINT X

VOLTAGE AT POINT Y

VOLTAGE AT POINT Z

VOLTAGE AT POINT A'

United States Patent Office 3,566,600
Patented Mar. 2, 1971

3,566,600
ELECTRIC TIME-PIECE
Koichi Yoshimura, Kadoma-shi, and Masahiko Shiota, Kirakata-shi, Japan, assignors to Matsushita Electric Industrial Co., Ltd., Osaka, Japan
Filed June 21, 1968, Ser. No. 738,877
Claims priority, application Japan, July 24, 1967, 42/48,039, 42/48,040, 42/64,589, 42/64,590, 42/64,591, 42/64,593; July 28, 1967, 42/65,761; Aug. 9, 1967, 42/51,605
Int. Cl. G04c 3/00
U.S. Cl. 58—23
11 Claims

ABSTRACT OF THE DISCLOSURE

An electric time-piece, wherein a magnetic or electric induction field of the commercial or line frequency which is leaked into the surrounding space is detected by commercial frequency detecting means, and a synchronous motor is driven in synchronism with signals resulting from the detection to thereby drive the time-piece mechanism connected with the synchronous motor.

BACKGROUND OF THE INVENTION

Field of the invention

This invention relates to a time-piece, and more particularly it pertains to a time-piece wherein a magnetic or electric induction field of the commercial or line frequency which is leaked into the surrounding space is detected by commercial frequency detecting means and a synchronous motor is driven in synchronism with signals resulting from the detection to thereby drive the time-piece mechanism connected with the synchronous motor.

DESCRIPTION OF THE PRIOR ART

U.S. Pat. No. 2,786,972, for instance, discloses a cordless electric time-piece which is driven in synchronism with signals obtained by detecting a space magnetic field of the commercial frequency leaked into the surrounding space. In accordance with the above U.S. patent, an electromotive force of the commercial frequency which is induced across an antenna due to the presence of an induction field of the commercial frequency is amplified so that a signal of the commercial frequency is spatially detected. If the induction field occurring at the antenna position is a stable magnetic field of sinusoidal waveform which is relatively strong and contains no higher harmonics and the amplitude and phase of which do not change with time, then satisfactory operation can be achieved with good time accuracy, from the standpoint of function. Thus, it is possible to construct a battery-operated, cordless electric time-piece.

Actually, however, the induction field of the commercial frequency is not so stable as described above. Such induction field is produced by a commercial power source, and it is utilized in the neighborhood of the position where the antenna is located. For this reason, the amplitude, phase and waveform of such field are varied either depending upon the load condition, such, for example, as the type of the load, or due to the turning-on or off of the power source, so that the field turns out to be extremely unstable. The commercial frequency is normally 50 or 60 Hz., which is much lower than radio and television signals. This means that the use of a commercial frequency tuning circuit formed by an antenna coil and a capacitor in the detector portion does not result in a high Q (Quality Factor). Therefore, it is often the case that higher harmonic components, such as second, third, etc., are difficult to remove so that difficulties are experienced in the detection of the commercial frequency. As a result, no matter how excellent the time-accuracy of the commercial frequency may be, it is impossible to construct a time-piece with improved time-accuracy. The most decisive drawback is that the synchronous motor for driving the time-piece mechanism may be stepped out of the synchronous condition due to the aforementioned changes in the phase, waveform, amplitude and so forth of the induction field, resulting in the time-piece being stopped from operating while it is being used.

SUMMARY OF THE INVENTION

It is an object of this invention to provide an electric time-piece, comprising primary and secondary windings wound on a magnetic antenna bar, and an LC oscillator circuit to which part of the output of said secondary winding is positively fed back, wherein said oscillator circuit is synchronized with an electromotive force of the line frequency which is induced across said windings by an induction field, and the coils wound on the antenna bar are adapted to serve as both oscillator coils and detector coils, thereby making the frequency of oscillation of said LC oscillator circuit conform to the line frequency.

It is possible to achieve relatively stable detection of the line frequency by said means, but if a synchronous motor which is manually started is used to drive the time-piece mechanism, the motor is brought into the "pull-out" condition due to rapid change in the magnetic field so that it is stopped from rotating and thereby stopping the time-piece. This means that the essential reequirement of a time-piece cannot be met.

Accordingly, a second object of this invention is to provide a multi-phase synchronous motor which is adapted for self-starting so that even if it is momentarily brought into the "pull-out" condition due to rapid change in the magnetic field, disturbances and so forth, it is enabled to rotate at the synchronous speed again, thereby preventing the time-accuracy of a time-piece from being adversely affected by such rapid change in the magnetic field, disturbances and so forth.

A third object of this invention is to construct the driving circuit for a synchronous motor which is self-started by a revolving field established by a simplified arrangement wherein a drive coil is connected in parallel with a series circuit of the other drive coil and a capacitor.

A fourth object of this invention is to provide a synchronous motor which is self-started by a multi-phase revolving field established by means of a plurality of motor drive coils connected with the output circuits of a plurality of multivibrator circuits which are periodically triggered by signals in synchronism with the line frequency, with the trigger signals being deviated from each other in terms of time.

A fifth object of this invention is to prevent erroneous operation due to disturbances by incorporating a filter circuit in the aforementioned time-piece.

A sixth object of this invention is to prevent erroneous operation due to disturbances and to eliminate higher harmonic components by providing a mechanical filter using a mechanical resonator element in the aforementioned electric time-piece.

A seventh object of this invention is to apply a constant voltage to the oscillator of a battery-operated electric time-piece to thereby avoid difficulties which are encountered in an attempt to produce oscillation in synchronism with the line frequency due to great deviation of the oscillation frequency from the line frequency which tends to occur with decrease in the battery voltage even if the frequency of oscillation of the LC oscillator circuit included in the detector portion is set very close to the line frequency.

An eighth object of this invention is to enhance the sensitivity of detection by concurrently detecting an electrostatic field induced in the casing which is electrically connected with the detector circuit of the electric time-piece.

In accordance with the present invention, an LC oscillator including primary and secondary windings wound on an antenna bar formed of a magnetic material is constructed and part of the secondary winding is positively fed back to the oscillator, the frequency of oscillation of which is set close to the line frequency. Said windings serve also as search coils for detecting the line frequency, since they are wound on the antenna bar. Thus, the frequency of oscillation of the foregoing oscillator is drawn to the line frequency by an electromotive force of the line frequency which is induced across the coil, so that the oscillator oscillates in synchronism with the line frequency. In this way, it is possible to detect a signal of the line frequency. In this case, since the oscillator is synchronized with the basic wave component of the line frequency, there is no possibility that higher harmonics such as second order, third order and so forth are detected, regardless of any distortion in the waveform of the induction field. Furthermore, because of the fact that the detector portion includes the oscillator, relatively stable detection can be achieved irrespective of variations in the amplitude, phase and waveform of the induction field. In prior art time-pieces, some difficulty is experienced in achieving compactness of the time-piece due to the high ratio of the space occupied by the antenna. With the arrangement of the present invention, however, the size of the antenna can be relatively reduced so that the difficulty just described can be effectively eliminated.

Other objects, features and advantages of the present invention will become apparent from the following description taken in conjunction with the accompanying drawings.

DESCRIPTION OF THE PREFERRED EMBODIMENTS

Figure 1:
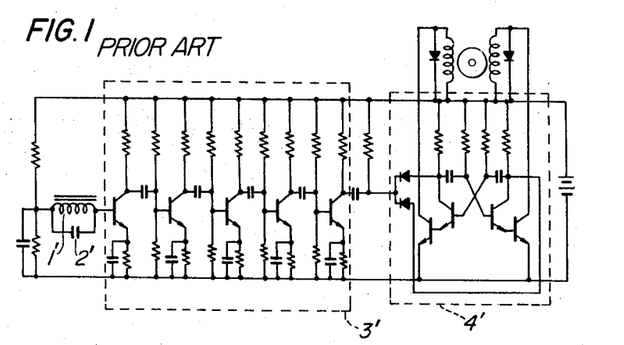
FIG. 1 is an electric circuit diagram showing a conventional electric time-piece.

In order to give better understanding of the present invention, description will first be made of a conventional electric time-piece with reference to FIGS. 1, 2 and 3.

The intensity of a space magnetic field of the commercial frequency is substantially in a range from $10^{-7}$ oe. to $10^{-2}$ oe. in an ordinary home, factory, laboratory and so forth. With the prior art, as shown in FIG. 1, such space field is detected by means of a circuit formed by an antenna coil 1' and a tuning capacitor 2' which are connected in parallel with each other; a signal resulting from the detection is amplified in a five-stage transistor amplifier 3', and a non-stable multivibrator 4' constituting a motor driving circuit is brought into the synchronous condition with the aid of the output of the amplifier.

Figure 2:
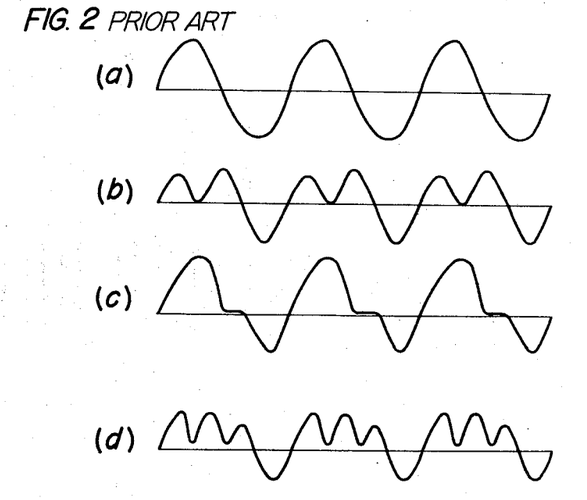
FIGS. 2 and 3 are views showing operational waveforms occurring in the time-piece shown in FIG. 1, respectively.

In general, the voltage waveform induced across the antenna coil 1' is sinusoidal, as shown in at a in FIG. 2.

Figure 3:
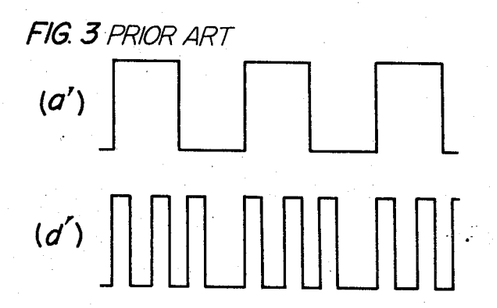

Thus, a rectangular waveform of the line frequency appears at the output of the amplifier 3' because of the limiter action of the amplifier, as shown at a' in FIG. 3. By synchronizing the free-running multivibrator 4' with the aid of an output obtained by differentiating the waveform shown in FIG. 3a', the frequency of oscillation becomes ½ of the line frequency. Thus, if the driving coil of the synchronous motor is connected with the output circuit, then the synchronous motor is rotated in synchronism with the line frequency.

In case, however, the antenna is located at a position where the line frequency space field intensity is as weak as in a range from $10^{-7}$ to $10^{-6}$ oe., or in case, although the antenna is located at a position where such intensity is strong on the average, it is oriented in such a direction that the field intensity becomes weak, a distorted waveform having higher harmonics superimposed upon the basic wave as shown at b, c and d in FIG. 2 will be induced across the antenna coil. This is due to the phase difference between currents flowing through many loads connected with the commercial power source and producing magnetic fields, waveform distortion, and the connection of two-phase or three-phase loads. The fact that Q of the antenna circuit 1' is low also constitutes one of the causes for the occurrence of the distorted waveform described above.

If the waveform shown at d in FIG. 2 is amplified, then such a waveform as shown at d' in FIG. 3 will appear at the output of the amplifier 3' which will made the synchronization of the succeeding stage unstable so that the motor tends to be stopped from rotation. In such a method where a power induced across the antenna coil 1' is directly amplified, accurate detection of the commercial frequency is impossible. In accordance with the conventional technique as described above, therefore, it is impossible to manufacture a practically utilizable cordless electric time-piece with high time accuracy in spite of the fact that use is made of accurate commercial frequency. When such time-piece is to be used for practical purposes, strict limitations are naturally imposed upon the selection of the usage and the location thereof.

Figure 4:
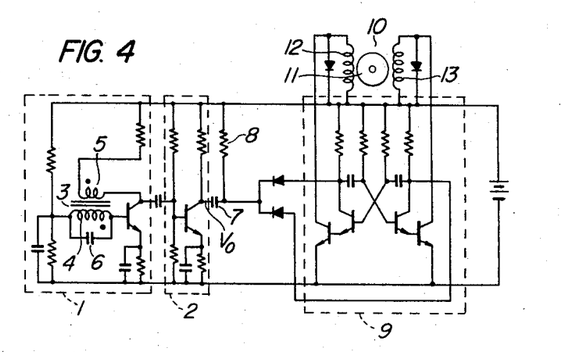
FIG. 4 is an electric circuit diagram showing the time-piece according to an embodiment of the present invention.
Figure 5:
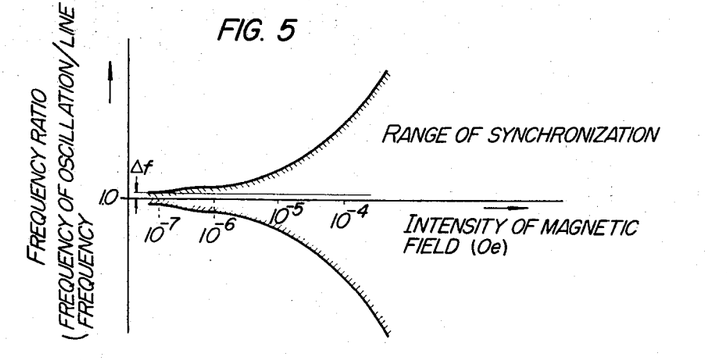
FIG. 5 is a view useful for explaining the operation of the time-piece shown in FIG. 4.

Referring now to FIGS. 4 and 5, description will be made of the electric time-piece according to an embodiment of the present invention.

The reference numeral 1 represents an oscillator circuit which is an LC oscillator circuit wherein a primary winding 4 and a secondary winding 5 are wound on an antenna bar 3, a capacitor 6 is connected in parallel with the primary winding, and the primary and secondary windings are connected with a oscillator transistor in such polarity that positive feedback is produced there-between.

The reference numeral 2 denotes an amplifier which provides as its output a rectangular voltage which in turn is differentiated by means of a differentiating circuit consisting of a capacitor 7 and a resistor 8 so that a free-running multivibrator 9 constituting the motor driving circuit is synchronized thereby. That is, by connecting driving coils 12 and 13 of a motor 10, including a permanent magnet rotor 11, with the output of the free-running multivibrator circuit 9, the motor 10 can be rotated in synchronism with the commercial frequency. By using the multivibrator 9 as the motor driving circuit, the duty ratio of the voltage applied to the motor coils 12 and 13 can be maintained constant irrespective of the amplitude of an input signal so that a waveform shaping effect can concomitantly be produced.

The frequency of oscillation of the LC oscillator circuit should be selected to be equal to or as close to the commercial frequency as possible. If the frequency of oscillation falls within the range as indicated by the oblique lines in FIG. 5, then the output signal will be in synchronism with the commercial frequency. The stronger the intensity of the field, the more positive becomes the synchronization even if the frequency of oscillation is deviated from the commercial frequency. If the frequency of oscillation is selected to be higher by $\Delta f$ than the commercial frequency as shown in FIG. 5, then oscillation can be produced in synchronism with the commercial frequency for a field intensity of $10^{-7}$ oe. or stronger.

Assume that there occur such waveform distortions as shown at b, c and d in FIG. 2 at a field intensity of $10^{-6}$ oe. Then, the multivibrator will be synchronized not with the higher harmonics but with the commercial frequency which is the basic wave component. If the basic wave component is small, there will be produced an output of self-oscillation frequency. In any event, such a situation that the output has a frequency remarkably different from the commercial frequency as shown at d' in FIG. 3 will not occur.

By constructing the oscillator circuit at the first stage in such a manner that the antenna coil also serves as the oscillator coil, and synchronizing the oscillator circuit with a space field of the commercial frequency, the problem of waveform distortion can be solved, and at the same time the circuit arrangement is greatly simplified as compared with the direct amplifying system described above in connection with FIG. 1.

If it is desired to decrease the rotational frequency of the motor, or if an electromagnet is used instead of the motor, this can easily be realized by providing a frequency divider circuit between the multivibrator and the signal output circuit. The requirements for a motor driving circuit are that the drive current be minimized since use is made of a battery power source, and that the waveform of a voltage applied to the motor be stable irrespective of any change in an input signal. To meet such requirements, drive coils 12 and 13 of a synchronous motor 10, including a permanent magnet rotor 11, were connected with the output circuit of the free-running multivibrator, so that the synchronous motor may be manually pulled in the synchronization to attain the synchronous speed. For a stable input signal, once the synchronous speed has been reached manually, there will be no possibility that during the operation the motor is brought into the "pull-out" condition to stop, without extremely great vibrations being imparted thereto.

Figure 6:
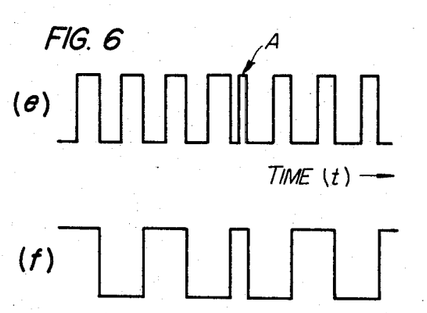
FIG. 6 is a view showing the operational waveforms occurring in the time-piece shown in FIG. 4.

However with a time-piece using signals obtained by detecting a commercial frequency space field as signal source, there will be a possibility that the motor is often made to stop due to the instability of the signal source. This means that the essential condition for the satisfactory operation of a time-piece cannot be met. FIG. 6 shows waveforms which occcur in the case of the above phenomenon, wherein e indicates the output waveform of the amplifier 2, and f shows the voltage waveform applied to the drive coil 12 or 13. If a load connected with the commercial power source is switched on or off in the neighborhood of the antenna coil, then a change will occur in the waveform as indicated by an arrow A in FIG. 6e, so that the voltage waveform applied to the motor is also changed for one cycle period as shown in FIG. 6f. Thus, the motor tends to be brought into the "pull-out" condition to stop. The duty ratio of the commercial frequency output voltage waveform differs between before and after the point of time when the pulse A occurs, whereas the duty ratio of the motor voltage remains constant. However, it is often the case in prior art devices, that if synchronization is lost, it is never achieved again, even though the waveform is returned to its original state immediately after the lapse of one cycle period. Since such a phenomenon has occured so frequently and it has been necessary to manually start the motor on every such occasion, serious problems have arisen in the practical operation. In addition, there arise various other problems, which may be regarded as electromagnetic disturbances. That is, the output signal becomes void for a moment due to a rapid change in the amplitude of the input signal, and an impulse voltage waveform occurs in the output due to electrostatic coupling. Moreover, the phase becomes critical when synchronization, which has been lost due to a power supply interruption, is to be achieved again upon the initiation of the power supply.

Figure 7:
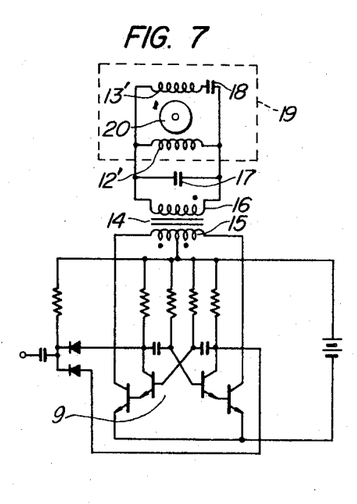
FIG. 7 is an electric circuit diagram showing part of the time-piece according to a second embodiment of the present invention.

FIG. 7 shows the circuit arrangement according to a second embodiment of the present invention which is free from the aforementioned problems with the conventional arrangement.

Referring to FIG. 7, there are shown portions corresponding to the multivibrator 9 and synchronous motor 10 of FIG. 4. With the output circuit of the free-running multivibrator 9 are connected the opposite ends of a primary winding 15, provided with an intermediate tap, of a transformer 14, and the tap is coupled to one terminal of the power source. A filter condenser 17 is connected in parallel with a secondary winding 16 of the transformer 14. By connecting the primary and secondary windings 15 and 16 in such polarity as shown in the drawing, a substantially sinusoidal A.C. voltage is developed across the secondary winding 16. That is, a current flows alternately through those portions of the primary winding 15 left and right with respect to the center tap, and a sinusoidal current resulting from the currents flowing through the both portions of the primary winding 15 flows through the secondary winding 16. By connecting the motor drive coil 12' and a series connection of the drive coil 13' and a phase-shifter capacitor 18 in parallel with the secondary winding 16, respectively, a phase difference occurs between the voltage applied to the drive coil 12' and that applied to the drive coil 13', with a result that there is established a revolving field. Thus, by such arrangement that the rotor 20 of the motor 19 is rotated in a predetermined direction and the motor gets self-started upon the turning-on of the power source, the time-piece can effectively be prevented from stopping since the motor, even if it is caused to stop due to electromagnetic disturbances, can immediately be returned to the original state.

Figure 8:
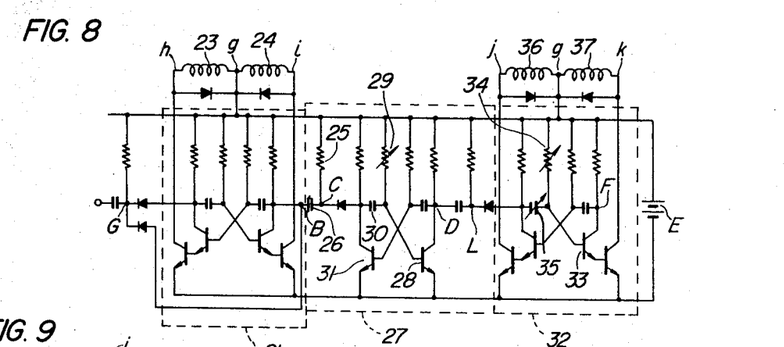
FIG. 8 is an electric circuit diagram showing the time-piece according to a third embodiment of the present invention.
Figure 9:
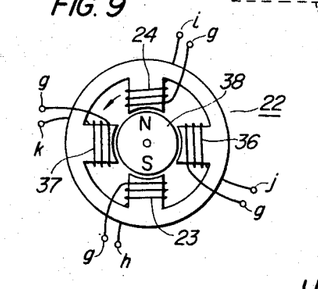
FIG. 9 is a diagrammatic view showing the drive motor portion of the electric time-piece shown in FIG. 8.
Figure 10:
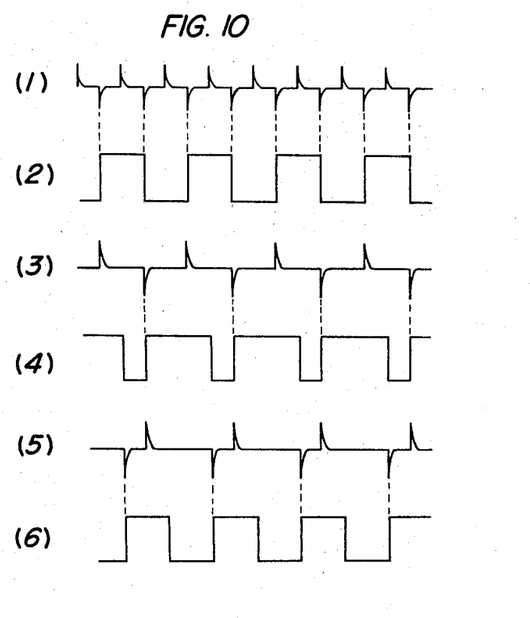
FIG. 10 is a waveform view useful for explaining the operation of the electric time-piece shown in FIG. 8.

FIG. 8 shows a third embodiment of the present invention, wherein a revolving field is established whereby the motor is adapted for self-starting and synchronous rotation. The reference numeral 21 represents a free-running multivibrator to the output circuit of which are connected drive coils 23 and 24 of a motor 22 such as shown in FIG. 9. The multivibrator 21 is synchronized by differential signals of the line frequency applied to a point G, which are obtained by detecting a space field which is leaked into the surrounding space, as shown in FIG. 10 (1). The voltage at output point B is of such rectangular waveform as indicated at (2) of FIG. 10.

In this case, by making the period of time during which the free-running multivibrator is in the "off" or "on" state during the self-oscillation thereof slightly longer than the cyclic period T of the line frequency, the multivibrator will easily permit a synchronous oscillation with a cyclic period of 2T. Rectangular wave voltages 180° out of phase with each other are alternately applied to the motor drive coils 23 and 24 at every cyclic period 2T. That is, when the voltage of the power source E is supplied to the drive coil 23 through the operation of the multivibrator 21, the other drive coil 24 is disconnected from the power source E. On the contrary, when the voltage of the power source E is imparted to the drive coil 24, the drive coil 23 is disconnected from the power source E. Thus, the phase difference between the voltages applied to the drive coils 23 and 24 becomes 180°.

By differentiating the voltage at the point B by means of a differentiating circuit consisting of a resistor 25 and a capacitor 26, such a voltage waveform as shown at (3) of FIG. 10 will occur at a point C. The reference numeral 27 represents a free-running multivibrator circuit provided for the phase-shifting purpose and which is synchronized with the voltage waveform occurring at the point C or the signal shown in FIG. 10 (3). By setting the period of time during which a transistor 28 is rendered non-conductive to 3/2T by means of a variable resistor 29 and a capacitor 30, a transistor 31 is switched from "off" to "on" after the lapse of 3/2T. By the synchronizing signal at the point C which is applied during the conduction of the transistor 28, the latter is again switched from "on" to "off." Thus, such a voltage waveform as shown in FIG. 10 (4) will appear at a point D.

A multivibrator circuit 32 constituting the motor driving circuit is synchronized with a voltage at a point L which is obtained by differentiating the voltage at the point D. The period of time for which the transistor 33 is rendered non-conductive is set to T by means of a variable resistor 34 and a capacitor 35. Thus, such a voltage waveform as shown in FIG. 10 (6) will appear at a point F.

In this way, the motor drive coils 36 and 37 will be alternately supplied, at every cyclic period of T, with rectangular wave voltages which are 180° out of phase with each other and differ by 90° from the voltages applied to the aforementioned drive coils 23 and 24. (Comparison of FIG. 10 (2) and (6) shows that the waveforms therein are 90° out of phase with each other.)

By connecting the drive coils 23, 24, 36 and 37 of the motor 22 in such polarity as shown in FIG. 9, a revolving field is established in the motor 22 so that the permanent magnet rotor 38 is rotated in a predetermined direction and upon application of the power source voltage, the motor is self-started in the predetermined direction.

A similar operation can be carried out by using bi-stable or mono-stable multivibrators instead of the free-running multivibrators 21 and 32 constituting the motor driving circuit.

Figure 11:
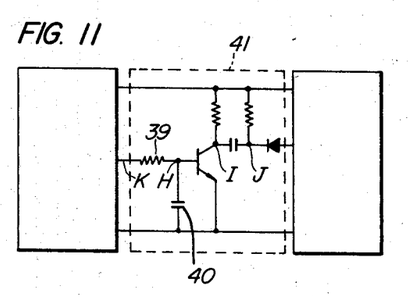
FIGS. 11 and 12 are an electric circuit diagram illustrating the electric time-piece according to a fourth embodiment of the present invention, and a view showing waveforms occurring therein.
Figure 12:
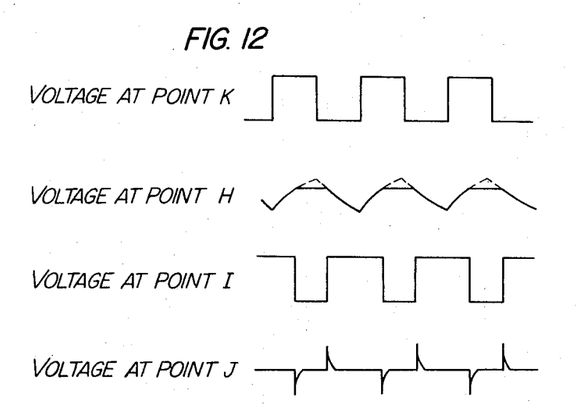

No substantial change will be caused in the operation if a mono-stable multivibrator is used instead of the free-running multivibrator 27 which is inserted between the two driving circuits for the phase-shifting purpose. Alternatively, use may be made of a phase-shifter circuit consisting of an integrating circuit formed by a resistor 39, a capacitor 40, and an amplifier 41, as shown in FIG. 11. The waveforms occurring at various points in the phase-shifter circuit are shown in FIG. 12. In this case, too, a similar operation can be performed.

From the foregoing, it will be appreciated that there is provided a cordless electric time-piece with sufficient time-accuracy to be put to practical use, wherein the phase-shifter circuit is inserted between the motor driving circuits, each constituted by a multivibrator circuit thereby producing voltages which are 90° out of phase with each other to establish a revolving field in a predetermined direction whereby a motor serving as driving source is self-started so that the motor is prevented from stopping even if the voltage applied thereto is momentarily disturbed due to electromagnetic disturbances.

Figure 13:
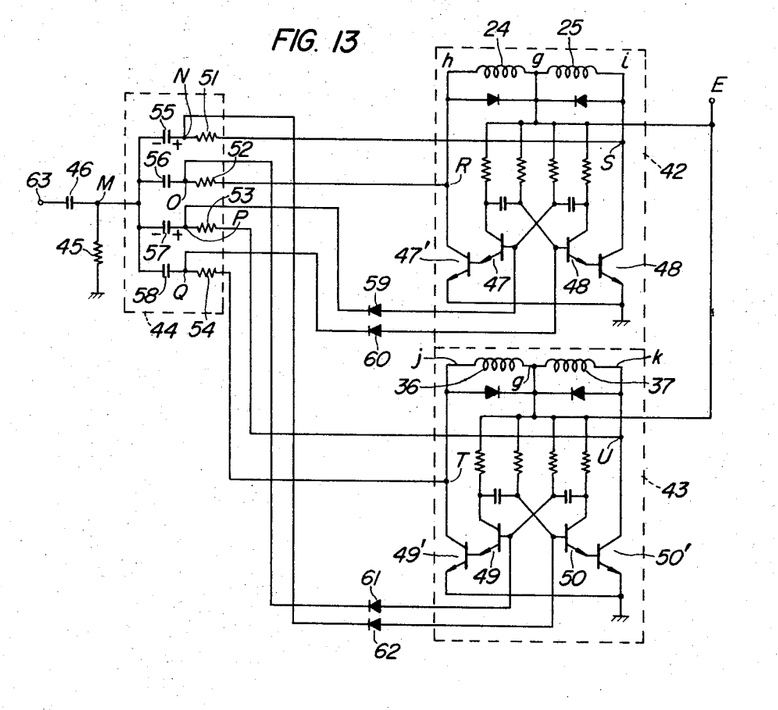
FIG. 13 is an electric circuit diagram illustrating the time-piece according to a fifth embodiment of the present invention.

Referring to FIG. 13, there is shown a fifth embodiment of the present invention wherein a revolving field is likewise established. In this embodiment, a synchronous motor is constructed which is self-started by a revolving field which is set up by imparting voltages which are 90° out of phase with each other to four drive coils of the motor, and such synchronous motor is used as driving source for said cordless electric time-piece which is thereby prevented from being stopped due to electro-magnetic disturbances.

In FIG. 13, the reference numerals 42 and 43 represent free-running multivibrators, the output circuits of which are connected the four drive coils 24, 25 and 36, 37 of the synchronous motor 22, respectively. The reference numeral 44 denotes an input signal distributing circuit for supplying synchronous signals to the free-running multivibrators 42 and 43 in predetermined order. The reference numeral 63 indicates an input terminal to which is applied an output voltage $V_0$ of the commercial frequency space field detecting circuit of FIG. 4 as input signal. A rectangular wave voltage of the line frequency imparted as input signal is differentiated by a resistor 45 and a capacitor 46, with the result that such voltage waveform as indicated at (1) of FIG. 14 appears at a point M. The free-running multivibrators 42 and 43 are synchronized with this signal through the distributing circuit. The operation is as follows.

Assume that in the multivibrators 42 and 43, transistors 47, 47' and 49, 49' are rendered conductive while transistors 48, 48' and 50, 50' are rendered non-conductive In such case, a point R is at ground potential, or 0 v. since the transistors 47 and 47' are conducting, and a point S is at a potential substantially corresponding to +E power source since the transistors 48 and 48' are rendered non-conductive.

In the case of the other multivibrator 43, too, a point T is at ground potential and a point U is at a potential corresponding to +E power source.

The points R, S, T, U are connected with the series circuits each consisting of a resistor and a capacitor of the distributing circuit 44. Thus, the capacitors 55 and 57 connected with the points S and U are charged with voltages in such polarity as shown in the drawing through the resistors 51 and 53, respectively. The condensers 56 and 58 are not charged since the points R and T are at ground potential.

Figure 14:
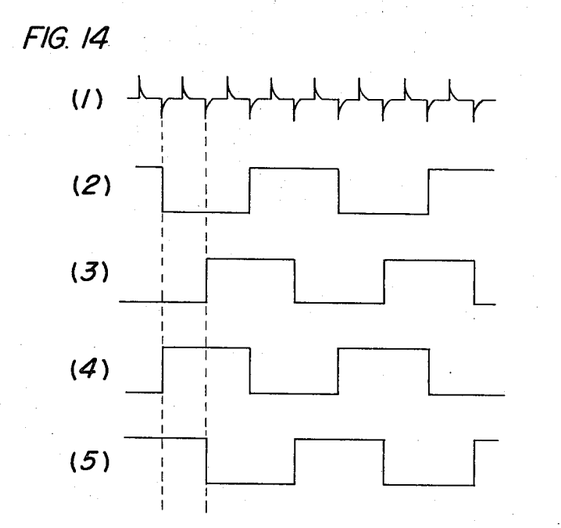
FIG. 14 is an operational waveform view useful for explaining the operation of the electric time-piece shown in FIG. 13.

Upon arrival of a synchronizing signal such as shown at (1) of FIG. 14 from the input terminal 63, a current is supplied to the base of the transistor 48 of the multivibrator 42 and to the base of the transistor 49 of the multivibrator 43 through diodes 61 and 60, respectively, although no current is supplied to the charged capacitors 55 and 57.

At this time, the transistor 49 is rendered non-conductive since it is supplied with the negative voltage of the synchronizing signal. The transistors 50 and 50' are turned off. Voltage applied to the base of the transistor 48 through the diode 60 is irrelevant to the operation since at this time the transistor 48 is in the non-conductive state. That is, reversal occurs when the +E power source which has been supplied to the drive coils 24 and 36 is now applied to the drive coil 37.

The charge in the capacitor 57 is discharged since the transistors 50 and 50' are in the conducting state, so that the capacitor 58 is now charged. Thus, it is the capacitors 55 and 58 that have been charged, so that a synchronizing signal such as shown at (1) of FIG. 14 is supplied from the output terminal 63 to the base of the transistor 47 through the capacitor 57 and diode 59. At this time also, the transistor 47 is in the non-conductive state.

Further, a synchronizing signal is supplied to the transistor 49 through capacitor 56 and diode 61. At this time, the transistor 49 is not relevant to the operation since it is in the non-conductive state.

In this way, the +E power source which has been supplied to the drive coil 24 of the multivibrator 42 is now supplied to the drive coil 25.

The voltage waveforms occurring at the points R, S, T and U are shown at (2) to (5) of FIG. 14, respectively.

Thus, by arranging the drive coils 24, 25 and 36, 37 of the multivibrators 42 and 43 in such a manner as shown in FIG. 9, the power source which has been supplied to the drive coils 24 and 36 is now supplied to the drive coils 24 and 37 and then to the drive coils 37 and 25. Consequently, the permanent magnet rotor 38 is rotated in the direction as indicated by the arrow. Furthermore, the motor can be self-started in a predetermined direction upon application of the power source voltage thereto, since it is driven by a revolving field. The voltages applied to the four drive coils of the motor are phase-shifted accurately by 90°, and this is very convenient for the operation of the motor.

In case it is desired that the driving frequency for the motor be decreased, an input signal is passed through a frequency divider circuit so that its frequency is decreased to a suitable extent, and the output signal of the decreased frequency is supplied to the distributing circuit 44.

No substantial change occurs in the operation if a bistable multivibrator is used instead of the free-running multivibrator.

Figure 15:
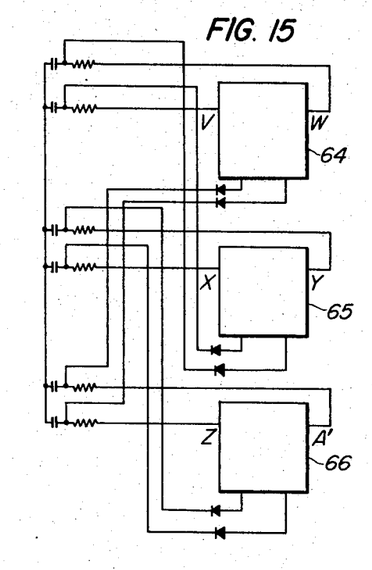
FIG. 15 is an electric circuit diagram showing the electric time-piece according to a sixth embodiment of the present invention.
Figure 16:
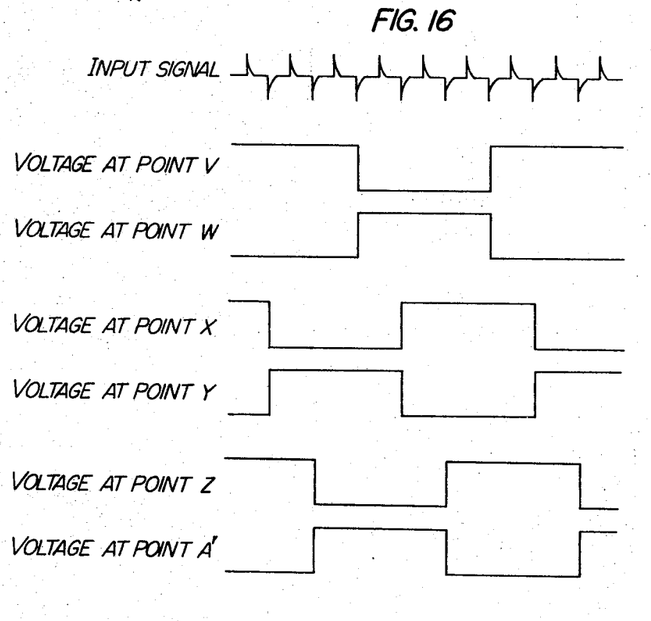
FIG. 16 is an operational waveform view useful for explaining the operation of the time-piece shown in FIG. 15.
Figure 17:
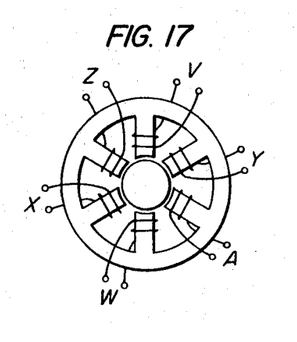
FIG. 17 is a diagrammatic view showing the drive motor portion of the time-piece shown in FIG. 15.

A similar arrangement can be accomplished by the use of three free-running multivibrators, as shown in FIG. 15. The reference numerals 64, 65 and 66 indicate free-running multivibrators such as shown at 42 and 43 in FIG. 13, in the block form. Waveforms occurring at points V, W, X, Y, Z and A' are shown in FIG. 16. In this case, there are provided six motor drive coils so that there is established a three-phase revolving field. The drive coil may be arranged as shown in FIG. 17.

With the above arrangement in which a plurality of multivibrators are provided and drive coils are incorporated in the output circuits of the multivibrators, a revolving field is set up by means of the drive coils, so that the synchronous motor is prevented from being stopped since the time-piece mechanism is synchronized with the detected signal of the line frequency even if its waveform is distorted due to disturbances.

Figure 18:
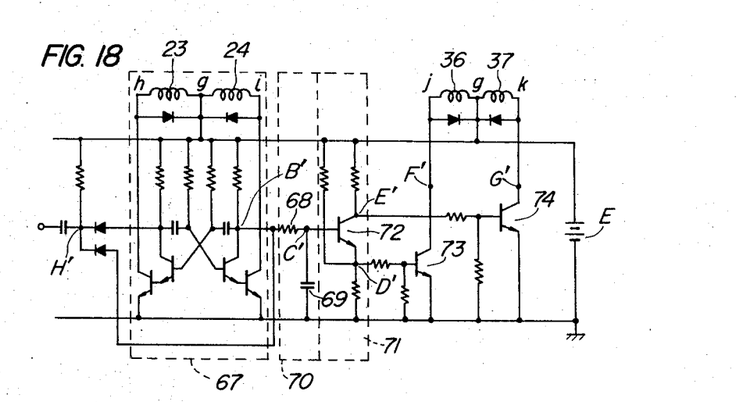
FIG. 18 is an electric circuit diagram showing the electric time-piece according to a seventh embodiment of the present invention.
Figure 19:
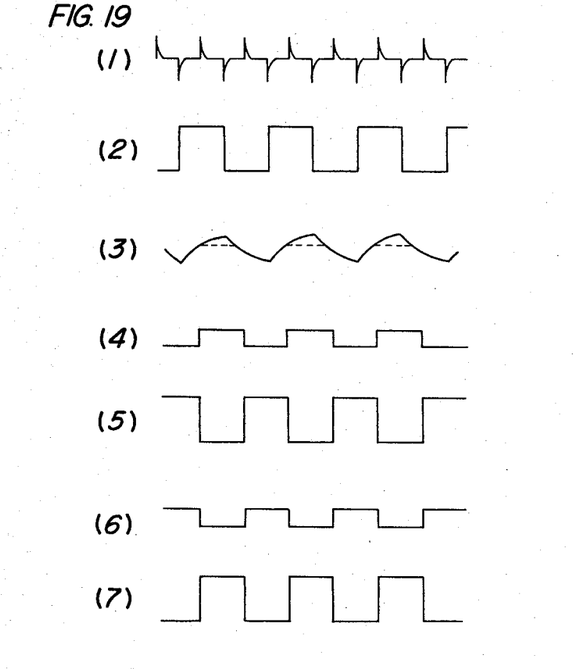
FIG. 19 is a view showing the operational waveforms occurring in the time-piece shown in FIG. 18.

FIG. 18 shows a seventh embodiment of the present invention wherein a revolving field is likewise established. In this embodiment, the output of a free-running multivibrator is phase-shifted substantially by 90° by means of an integrating circuit, and then it is passed through a phase inverter circuit and thereafter amplified, so that there is produced an amplified output which is phase-shifted substantially by 90° from the output of said free-running multivibrator. Four drive coils are provided of which two each are connected with each of two output circuits, which outputs are 180° out of phase with each other, thereby establishing a revolving field. In this way, there is provided a time-piece using a synchronous motor capable of self-starting as driving source for the time-piece mechanism so that it is prevented from being stopped due to electromagnetic disturbances. Description will be made in connection with FIG. 18, wherein the reference numeral 67 represents a free-running multivibrator having a commercial frequency space field detecting circuit incorporated in the input circuit thereof. Motor drive coils 23 and 24 are connected with the output circuit of the free-running multivibrator. The motor is synchronized with such signals as shown at (1) in FIG. 19 which are provided by the line frequency detecting circuit. The drive coils 23 and 24 are alternately supplied with such a rectangular wave voltage as shown at (2) in FIG. 19. Equivalently, voltages which are 180° out of phase with each other are applied to the coils 23 and 24.

The foregoing arrangement is similar to that of FIG. 8, except that one of the outputs of the free-running multivibrator 67 is supplied to an integrating circuit consisting of a resistor 68 and a capacitor 69. At a point C', there appears such a triangular wave voltage as shown at (3) in FIG. 19 which is obtained by integrating the rectangular wave voltage. The resulting triangular voltage is applied to a phase inverter circuit 71 comprising a transistor 72. The voltage at the emitter D' and that at the collector E' of the transistor 72 are 180° out of phase with each other, as shown at (4) and (6) in FIG. 19. These voltages are substantially 90° out of phase with the output of the free-running multivibrator 67 because of the integrating circuit. The outputs appearing at the points D' and E' are amplified by transistors 73 and 74 respectively. Thus, drive coils 36 and 37 which are connected with the output circuits of the transistors 73 and 74, respectively, are supplied with rectangular wave voltages which are substantially 90° out of phase with the voltages applied to the drive coils 23 and 24. By arranging these four drive coils 23, 24, 36 and 37 as shown in FIG. 9, there is established a field revolving in a predetermined direction whereby the permanent magnet rotor 38 can be rotated. A cordless time-piece which is driven in synchronism with signals obtained by detecting a space field of the line frequency by using the motor driving circuit and motor which are constructed as described above instead of those shown in FIG. 4, because of the field revolving in the predetermined direction, can be prevented from being stopped due to the disturbances. Thus, it is possible to construct a practically effective time-piece.

In the embodiment of FIG. 18, as described above, the time-piece mechanism is driven by means of a two-phase synchronous motor, including four drive coils, which is driven by a revolving field. Particularly, a plurality of integrating circuits are provided in parallel with each other in the basic multivibrator, and a phase-inverter circuit and drive coil are connected with each of the integrating circuits. The integral values of said plurality of integrating circuits are made different from each other. Thus, a multi-phase synchronous motor is constructed which is prevented from being stopped due to disturbances since a revolving field is set up as described above.

Impulse voltages may occur in the output when a load such as electric equipment connected with the commercial power source in the neighborhood of the time-piece is turned on or off, so that the multivibrator used in the motor driving circuit may be triggered thereby. Thus, the motor tends to be brought into the "pull-out" condition.

Figure 20:
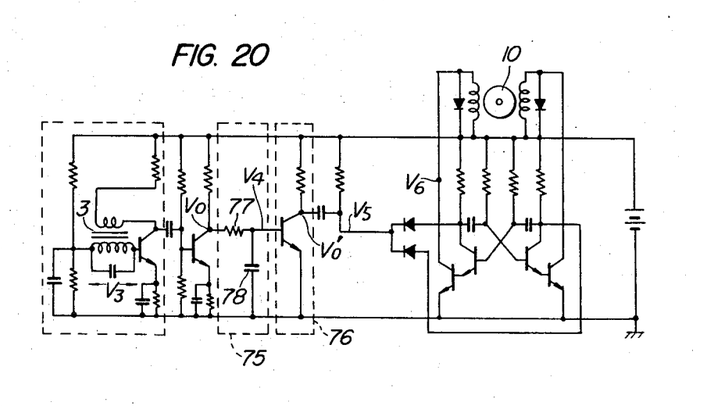
FIG. 20 is an electric circuit diagram showing the electric time-piece according to an eighth embodiment of the present invention.

FIG. 20 shows an example of the conventional time-piece wherein a filter circuit is provided for eliminating pulse voltages to thereby prevent any impulse voltage from occurring in the output. This arrangement is similar to that of FIG. 4, except that there are provided a filter circuit 75 consisting of a resistor 77 and a capacitor 78, and an amplifier circuit 76 for converting the output of the filter circuit to a rectangular wave voltage again.

Figure 21:
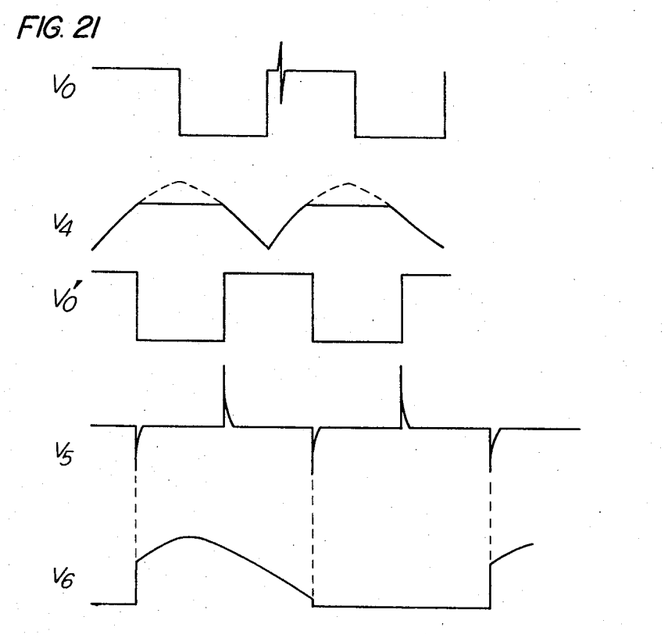
FIG. 21 is a view showing the waveforms occurring in the commercial power source frequency detecting circuit and the filter circuit which are incorporated in the time-piece shown in FIG. 20.

Observation of the voltage waveforms appearing at various positions when the power source for an electric device located near the antenna bar 3 is turned on or off shows that an impulse I' occurs upon the opening or closure of the power source switch, as shown in FIG. 21.

This impulse is the input voltage applied to the filter circuit 75. Thus, the impulse is superimposed upon the rectangular wave, as shown at $V_0$ in FIG. 21. The resulting waveform is integrated by the filter circuit 75 so that the impulse is eliminated. That is, the rectangular wave voltage $V_0$ is converted to a rectangular wave $V_4$ which is in turn clipped by the implifier circuit 76 so as to be converted to a rectangular wave again. No impulse voltage will remain in the output of this circuit, so that the free-running multivibrator 4 operates stably. Thus, a normal voltage such as shown at $V_6$ in FIG. 21 will be applied to the motor M.

Figure 22:
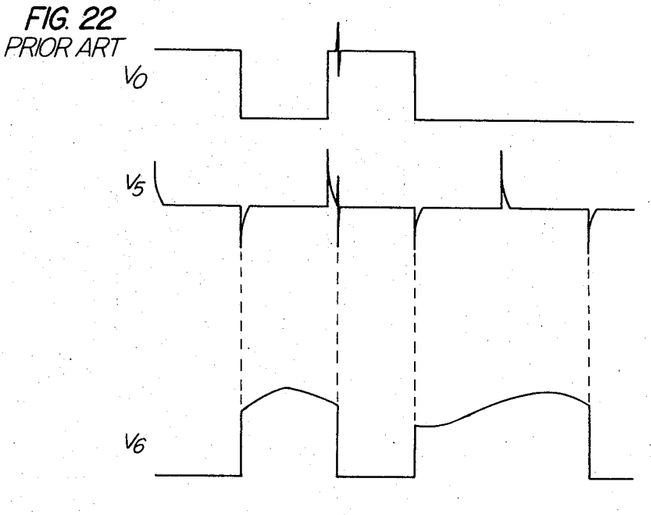
FIG. 22 is a view showing the waveforms occurring in various portions of the prior art device.

In the absence of the filter circuit 75, the free-running multivibrator tends to be triggered by an impulse signal as shown in FIG. 22, resulting in an unstable operation. In most cases, therefore, the motor M will stop.

In the present embodiment, the impulse can be completely removed, and therefore it is possible to avoid the adverse influence due to the opening and closure of the switch of an external electric device, thus always resulting in normal operation.

Figure 23:
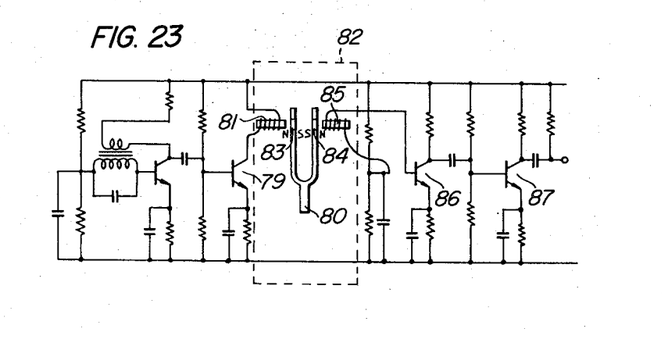
FIG. 23 is an electric circuit diagram showing the time-piece according to a ninth embodiment of the present invention.

FIG. 23 shows a ninth embodiment of the present invetion wherein use is made of a mechanical filter with high Q constituted by a mechanical vibrator to thereby eliminate disturbances. In FIG. 23, there are shown portions corresponding to the oscillator circuit 1 and amplifier circuit 2 shown in FIG. 4.

A signal of the line frequency is supplied to a vibrator element 80 connected with the output circuit of a transistor 79. The reference numeral 82 represents the mechanical filter portion constituting the major feature of the FIG. 23 arrangement. The vibrator element 80 is provided with permanent magnets 83 and 84 as indicated by oblique lines in the drawing, and its resonance frequecy is set to the line frequency. Thus, application of the output of the amplifier transistor 79 to a drive coil 81 causes the resonance of the vibrator element 80. The frequency of vibration of the vibrator element is detected by a separate search coil 85, and a signal resulting from the detection is amplified by transistors 86 and 87. The provision of the mechanical filter 82 in the signal amplifier circuit prevents such distorted waveforms as shown at b–d in FIG. 2 and at $V_0$ in FIG. 21 from appearing in the amplifier circuit provided after the mechanical filter 82, because of high Q of the latter, so that there is obtained a basic wave of the line frequency.

Figure 24:
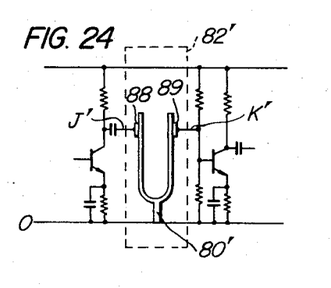
FIG. 24 is a diagrammatic view showing the main portion of the time-piece according to a tenth embodiment of the present invention.

In order to energize the vibrator element, use can be made of not only drive coils but also of a magnetostrictive element, piezo-electric elements or the like. FIG. 24 shows by way of example the case where there is provided a mechanical filter 82' using piezoelectric elements. Piezo-electric elements 88 and 89 are affixed to a vibrator element 80'. If an amplified signal of the line frequency is supplied between J' and O, then a filtered signal is obtained between K' and O. In this way, an amplified signal of the line frequency is produced, as is the case in FIG. 23.

As described above, in accordance with the present embodiment, a mechanical resonator element is provided between a detector means for detecting a space field of the line frequency and an electro-magnetic means such as a motor for driving the time-piece mechanism. In general, high Q cannot be achieved at a low frequency such as the line frequency by the use of electric elements such as an inductor and a capacitor. In the case of a mechanical element, however, the loss in the vibration is so little that a high Q which can by no means be achieved through the use of electric elements can be obtained, so that electromagnetic disturbances can be effectively eliminated. Thus, by using such mechanical vibrator element in a cordless time-piece which is adapted to be driven in synchronism with signals obtained by detecting the line frequency, the time accuracy as well as the operational stability of the motor can be remarkably improved.

Since the antenna coil us used also as oscillating coil for the oscillator circuit incorporated in the space field detecting circuit as shown in FIG. 4, synchronization with respect to the external line frequency will become impossible unless the frequency of oscillation is set as close to the line frequency as possible. Furthermore, since a battery is used as the power source for the electric time-piece, the terminal voltage thereof being low, the constants of the transistor are greatly changed with change in the battery voltage so that the frequency of oscillation is greatly influenced. Thus, the frequency of oscillation will be changed gradually, and finally the "pull-out" condition is reached so that the synchronous oscillation becomes interrupted.

Figure 26:
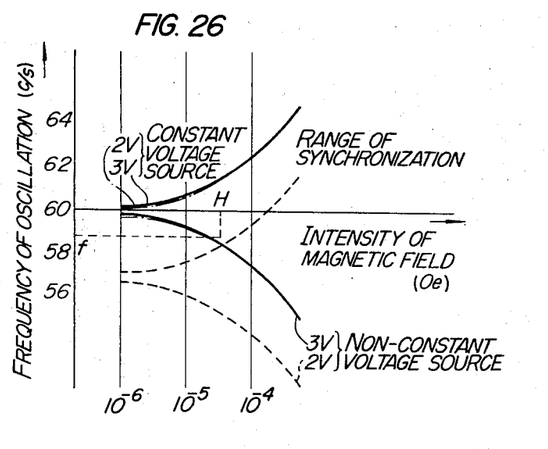
FIG. 26 is a view useful for explaining the operation of the prior art device.

FIG. 26 illustrates such situation as described above, wherein the intensity of a space field having the line frequency is indicated on the horizontal axis and the frequency of oscillation of the oscillator is indicated on the vertical axis. The portion indicated by oblique lines corresponds to the region for synchronous oscillation. From this, it will be seen that if the intensity of the line frequency space field is strong, then the synchronous oscillation can be maintained regardless of the great deviation of the frequency of oscillation of the oscillator from the line frequency (60 Hz.).

Assume that the frequency of oscillation of the oscillator is set at $f$. Then, synchronous oscillation occurs at a point H when source voltage is 3 v., while if the voltage is reduced to 2 v., then the synchronous characteristic becomes as shown by the dotted line in the drawing, so that a "pull-out" condition occurs resulting in an oscillation at the frequency $f$. The result will be deterioration in the time-accuracy of the electric time-piece.

Figure 25:
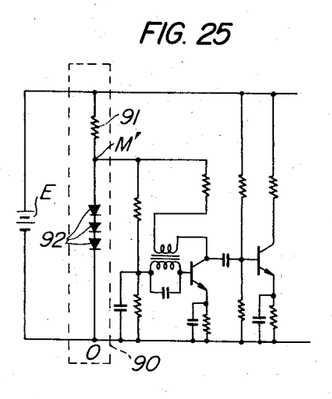
FIG. 25 is an electric circuit diagram showing the time-piece according to an eleventh embodiment of the present invention.

FIG. 25 shows a twelfth embodiment of the present invention which is adapted to eliminate the above drawbacks.

Figure 27:
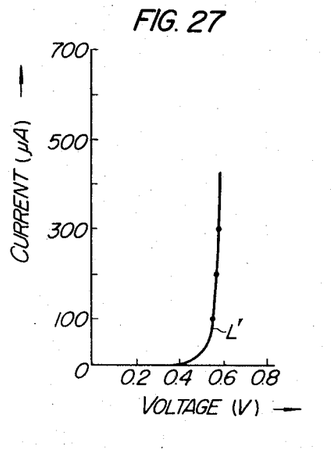
FIGS. 27 and 28 are views useful for explaining the operation of the electric time-piece according to the present invention.
Figure 28:
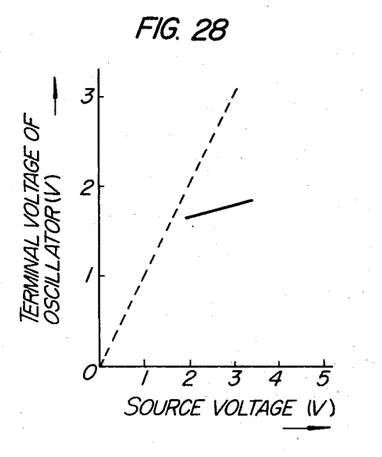

In FIG. 25, the reference numeral 90 represents a constant voltage circuit wherein a series circuit of a resistor 91 and three silicon diodes 92 are connected in parallel with a battery power source E. The voltage-current characteristic of each silicon diode 92 is as shown in FIG. 27, wherein a substantially constant voltage is obtained beyond a point L' (the voltage remains substantially constant with change in the current), so that the voltage between O and M' in the arrangement of FIG. 25 becomes substantially constant, as shown by the solid line of FIG. 28.

The synchronous characteristics of the constant voltage circuit constructed in the above manner are shown by the solid lines and one-dot chain line in FIG. 26. From this, it will be appreciated that the synchronous characteristics remain substantially the same regardless of a change in the power source voltage. Thus, it is possible to prevent deterioration of the time-accuracy due to the voltage variation, so that the present time-piece can be used in a weaker magnetic field.

The method of detection by an oscillator is remarkably effective from the standpoint of waveform distortion, but the frequency of oscillation is greatly varied with voltage variations since the power source is used at a low voltage so that the "pull-out" condition tends to occur. However, such condition can be prevented by imparting a constant voltage to the oscillator portion.

Figures 29, 30:
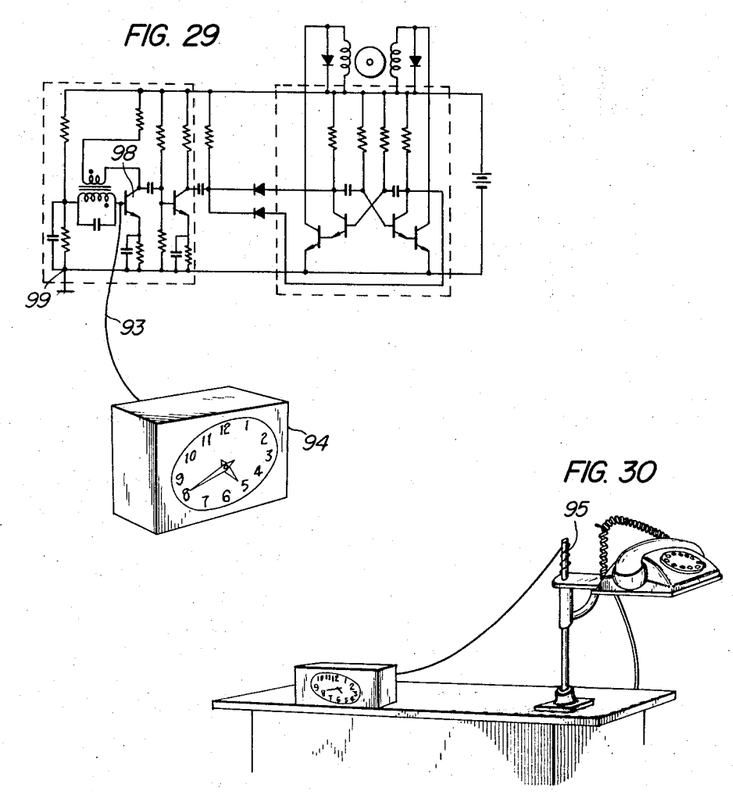
FIG. 29 is an electric circuit diagram showing the electric time-piece according to the twelfth embodiment of the present invention.
FIGS. 30 and 31 are views useful for explaining the electric time-piece according to a thirteenth embodiment of the present invention.

FIG. 29 shows an arrangement wherein an induction electric field is detected simultaneously with an induction magnetic field so that the line frequency can be detected stably.

One end of a lead wire 93 is connected with the base of a transistor 98 to which an input signal is supplied, and the other end of the lead wire is connected to the casing of an electric time-piece 94, especially a portion formed by a conductive material of the casing.

Thus, a magnetic field of the line frequency which occurs between ground point 99 and the above conductive plate is additionally applied to the input.

With such arrangement, a signal resulting from an electric field is supplied even in the absence of a magnetic field, so that equivalently the input signal becomes as great as in the case where a strong magnetic field is applied. Furthermore, an electric field can be detected more stably than a magnetic field since the intensity of the former is not so unstable as that of the latter, that is, the magnitude of an electric field is less varied with time.

Figure 31:
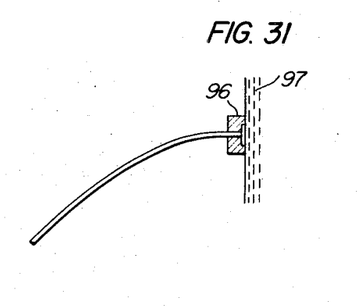

Still furthermore, if the intensity of an electric field is sufficiently strong, the operation can be performed even in the absence of a magnetic field, as described above. The sensitivity of detection can be further enhanced by connecting the ground point to a separate conductive material which is electrically insulated from the conductive plate. Such conductive material may be either the same as that used in the casing as described above or any other good conductor such as used for the face of a time-piece, base plate of time-piece mechanism, casing which magnetically shields a motor, battery holder and so forth. The stability of detection can be further improved either by connecting one end of a lead wire taken from the time-piece body to a conductive substance located in the neighborhood of the time-piece body as shown in FIG. 30 or connecting the lead wire to a large magnetic plate such as an iron plate 97, for example, located adjacent to the time-piece by such a method as to cause a magnet 96 attached to one end of the lead wire to be adsorbed to the iron plate.

With the above simplified arrangement wherein a lead wire is taken from a portion where an input signal enters and one end of the lead wire is connected with a conductive substance located either within the time-piece body or adjacent thereto, the sensitivity of detection can be equivalently improved without adding any special means, and at the same time the stability of detection can also be increased.

What is claimed is:

1. A time-piece comprising an oscillator circuit including primary and secondary windings wound on a magnetic antenna bar, said secondary winding constituting a positive feedback loop, said oscillator circuit having its oscillation frequency set to the frequency of a commercial power source and being synchronized by an electromotive force which is induced across said windings by an induction magnetic field at the commercial power source frequency which is present in the space, a synchronous motor for driving the time-piece mechanism, and means connected between said oscillator circuit and said synchronous motor for driving said synchronous motor to rotate in synchronism with the output of said oscillator circuit.

2. A time-piece according to claim 1, wherein said synchronous motor is constructed of the self-starting type.

3. A time-piece according to claim 2, wherein said synchronous motor includes first and second drive coils, said second drive coil being connected in parallel with a series circuit of said first drive coil and a capacitor so as to construct the synchronous motor of the self-starting type.

4. A time-piece according to claim 2, wherein said synchronous motor includes first and second drive coils connected with the output circuits of two multivibrators, a phase-shifter circuit is provided between said two multivibrators, and means is provided for applying the output of an oscillator circuit adapted for oscillation at the commercial power source frequency to one of said two multivibrators as synchronizing signal.

5. A time-piece according to claim 2, further including a plurality of multivibrators with the output circuits of which are connected the drive coils of a synchronous motor for driving the timepiece mechanism, and a signal distributing circuit for distributing the output of an oscillator circuit adapted for oscillation at the commercial power source frequency to said multivibrators to thereby synchronize said multivibrators in predetermined order.

6. A time-piece according to claim 2, wherein said means for driving said synchronous motor comprises a multivibrator which is connected with the output of said oscillator circuit, a drive coil of said synchronous motor being connected with the output circuit of said multivibrator, an integrating circuit having at least one integral value for integrating the output of said multivibrator, a phase-inverter circuit connected with the output of said integrating circuit, and means for imparting an inverted signal and non-inverted signal to another drive coil of said synchronous motor.

7. A time-piece according to claim 1, wherein the power source for the oscillator circuit is so designed as to provide a constant voltage.

8. A time-piece according to claim 1, wherein a filter circuit is provided between the output of the oscillator circuit and the input of the synchronous motor for removing pulse-like noise which is superimposed upon the output voltage of the oscillator circuit due to disturbances.

9. A time-piece according to claim 8, wherein said filter circuit is constituted by an integrating circuit.

10. A time-piece according to claim 8, wherein said filter circuit is constituted by a mechanical resonator element.

11. A time-piece according to claim 1, wherein the input terminal of the oscillator circuit is connected with a conductive material for detecting a space electric field of the line frequency.

References Cited

UNITED STATES PATENTS 2,786,972  3/1957  Drier et al. _________ 58—266
3,090,013  5/1963  Scantlin et al. ______ 331—172X RICHARD B. WILKINSON, Primary Examiner E. C. SIMMONS, Assistant Examiner U.S. Cl. X.R.

318—16; 58—24, 26